United States Patent
Setterberg et al.

(10) Patent No.: US 9,607,205 B2
(45) Date of Patent: Mar. 28, 2017

(54) FINGERPRINT AUTHENTICATION USING TOUCH SENSOR DATA

(71) Applicant: FINGERPRINT CARDS AB, Göteborg (SE)

(72) Inventors: Eric Setterberg, Västra Frölunda (SE); Hamid Sarve, Göteborg (SE); Hans Thörnblom, Kungsbacka (SE); Kenneth Jonsson, Kungälv (SE)

(73) Assignee: FINGERPRINT CARDS AB, Göteborg (SE)

( * ) Notice: Subject to any disclaimer, the term of this patent is extended or adjusted under 35 U.S.C. 154(b) by 0 days.

(21) Appl. No.: 14/951,056

(22) Filed: Nov. 24, 2015

(65) Prior Publication Data
US 2016/0180146 A1  Jun. 23, 2016

(30) Foreign Application Priority Data
Dec. 18, 2014  (SE) ...................... 1451578

(51) Int. Cl.
*G06K 9/00* (2006.01)
*G06F 3/044* (2006.01)
*G06F 1/16* (2006.01)

(52) U.S. Cl.
CPC ....... *G06K 9/00087* (2013.01); *G06F 1/1684* (2013.01); *G06F 3/044* (2013.01); *G06K 9/0002* (2013.01); *G06K 9/00067* (2013.01)

(58) Field of Classification Search
CPC .......... G06K 9/00067; G06K 9/00926; G06K 9/036; G06K 9/00006; G06K 9/00919; G06F 21/32; G06F 3/03547; G06F 3/0488
See application file for complete search history.

(56) References Cited

U.S. PATENT DOCUMENTS

2009/0316963 A1  12/2009  Boshra
2010/0066697 A1   3/2010  Jacomet et al.
(Continued)

FOREIGN PATENT DOCUMENTS

KR    20130030170 A    3/2013

OTHER PUBLICATIONS

Edwards, M.B. et al., "The Use of Fingerprint Contact Area for Biometric Identification," Advances in Biometrics Lecture Notes in Computer Science 2005, vol. 3832, pp. 341-347.
(Continued)

*Primary Examiner* — Bhavesh Mehta
*Assistant Examiner* — Ian Lemieux
(74) *Attorney, Agent, or Firm* — Remarck Law Group PLC

(57) ABSTRACT

A method of authenticating a candidate fingerprint by means of an electronic device comprising a touch sensor; and a fingerprint sensor. The method comprises the steps of: acquiring at least one touch sensor signal indicative of a sub-area of the touch sensor being touched by the candidate finger; acquiring at least one fingerprint image of the candidate fingerprint; retrieving a stored enrollment representation of the enrolled fingerprint of the enrolled finger; determining an authentication representation of the candidate fingerprint based on the fingerprint image; and determining an authentication result based on the authentication representation, the stored enrollment representation, and the at least one touch sensor signal.

12 Claims, 10 Drawing Sheets

(56) References Cited

U.S. PATENT DOCUMENTS

| | | | |
|---|---|---|---|
| 2012/0127179 A1* | 5/2012 | Aspelin | G06F 21/32 |
| | | | 345/441 |
| 2013/0257758 A1 | 10/2013 | Huang | |
| 2013/0272586 A1* | 10/2013 | Russo | G06K 9/00087 |
| | | | 382/124 |
| 2013/0279770 A1* | 10/2013 | Abe | G06K 9/00087 |
| | | | 382/124 |
| 2014/0270415 A1 | 9/2014 | Alameh et al. | |
| 2015/0047017 A1 | 2/2015 | Kim et al. | |
| 2015/0161368 A1 | 6/2015 | Stewart et al. | |

OTHER PUBLICATIONS

PCT International Search Report dated Apr. 7, 2016 for PCT International Application No. PCT/SE2015/051322, 5 pages.

* cited by examiner

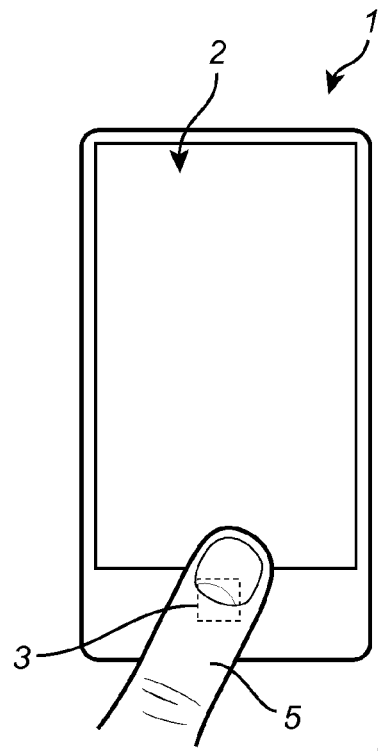
Fig. 1
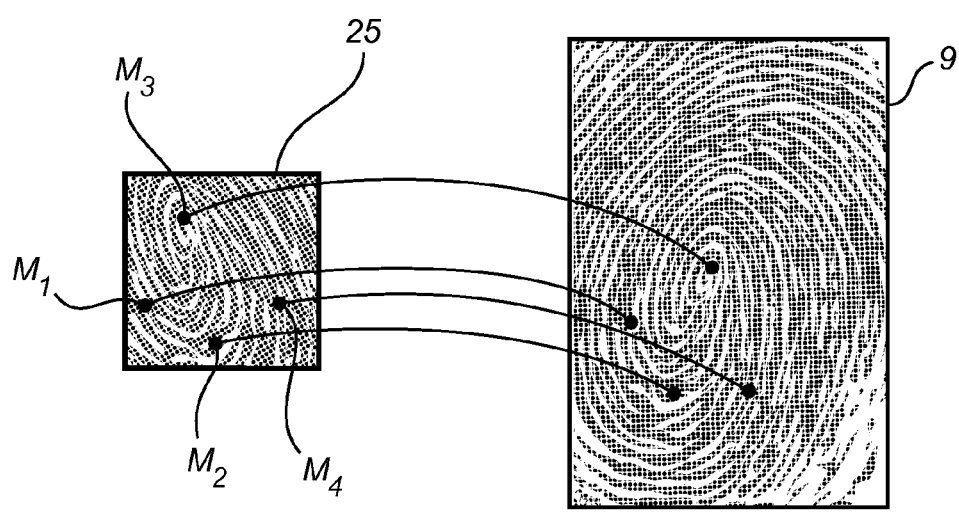
(Prior art) Fig. 2

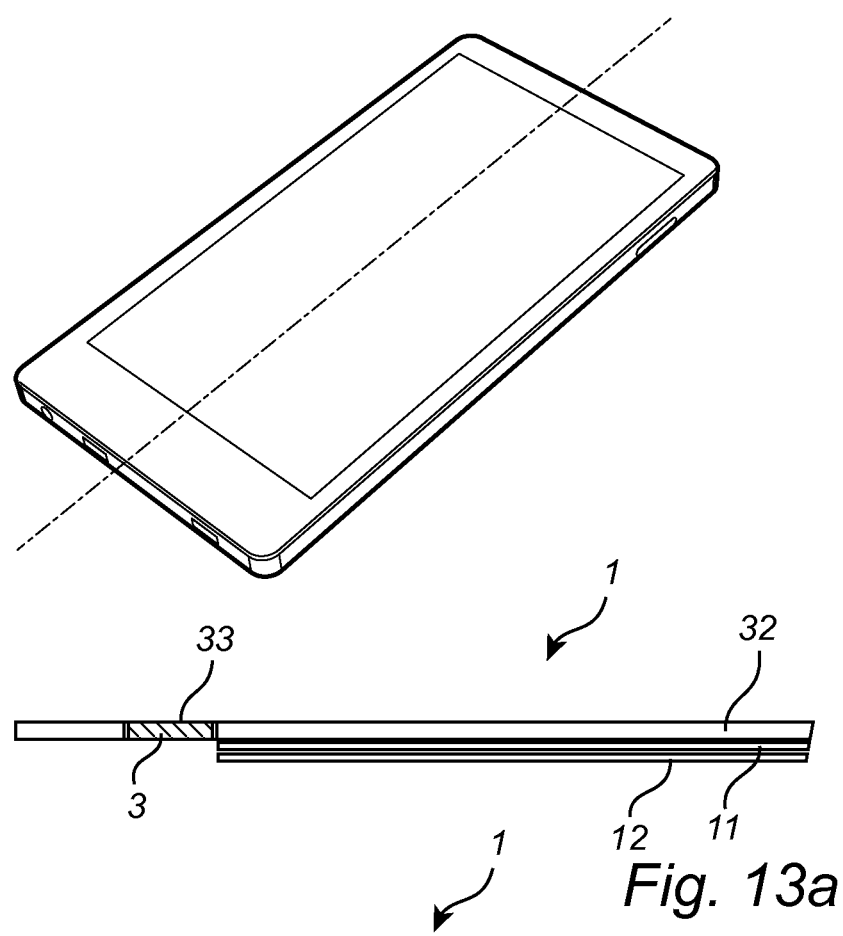
Fig. 13a
Fig. 13b
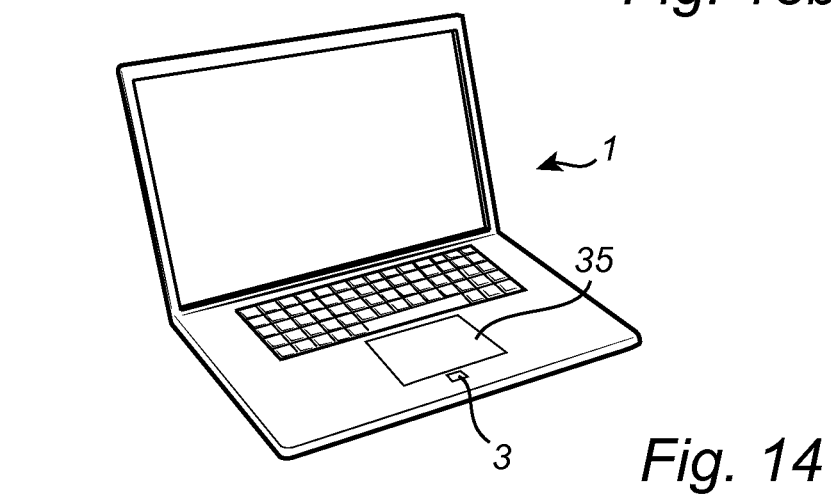
Fig. 14

FINGERPRINT AUTHENTICATION USING TOUCH SENSOR DATA

CROSS-REFERENCE TO RELATED APPLICATIONS

This application claims the benefit of Swedish Patent Application No. 1451578-7, filed Dec. 18, 2014. The disclosure of the above application is incorporated herein by reference in its entirety.

FIELD OF THE INVENTION

The present invention relates to a device and method for authenticating a candidate fingerprint against an enrolled fingerprint.

BACKGROUND OF THE INVENTION

Various types of biometric systems are used more and more in order to provide for increased security and/or enhanced user convenience.

In particular, fingerprint sensing systems have been adopted in, for example, consumer electronic devices, thanks to their small form factor, high performance, and user acceptance.

For continued trust in fingerprint sensing systems, it is important to provide fingerprint sensing systems with high performance in terms of convenience as well as security. In particular, it would be desirable to provide fingerprint sensing systems that are capable of rejecting attempts to get a positive authentication result using a fake finger.

Various fingerprint sensing systems, employing so-called anti-spoofing measures, have been suggested.

For example, US2009/0316963 discloses a fingerprint sensor including a finger sensing area and a controller. The controller aligns authentication data and enrollment data and performs spoof attempt detection based on corresponding pairs of finger features and their spatial locations in the aligned enrollment and authentication data.

However, it would still be desirable to provide for authentication with an improved performance, in particular in respect of rejecting spoofing attempts.

SUMMARY

In view of the above-mentioned and other drawbacks of the prior art, it is an object of the present invention to provide for improved authentication, in particular in respect of rejecting spoofing attempts.

According to a first aspect of the present invention, it is therefore provided a method of authenticating a candidate fingerprint of a candidate finger against an enrolled fingerprint of an enrolled finger by means of an electronic device comprising: a touch sensor for touch-based control of the electronic device, the touch sensor having an active area corresponding to a first surface portion of the electronic device; a fingerprint sensor having an active area corresponding to a second surface portion of the electronic device; and processing circuitry connected to the touch sensor and to the fingerprint sensor, wherein the method comprises the steps of: acquiring, from the touch sensor, for a candidate finger placement on the fingerprint sensor, at least one touch sensor signal indicative of a sub-area of the touch sensor being touched by the candidate finger; acquiring, from the fingerprint sensor, for the candidate finger placement on the fingerprint sensor, at least one fingerprint image of the candidate fingerprint; retrieving, by the processing circuitry, a stored enrollment representation of the enrolled fingerprint of the enrolled finger; determining, by the processing circuitry, an authentication representation of the candidate fingerprint based on the fingerprint image; and determining, by the processing circuitry, an authentication result based on the authentication representation, the stored enrollment representation, and the at least one touch sensor signal.

It should be noted that the steps of methods according to embodiments of the present invention need not necessarily be in the order recited in the claims.

The touch sensor may be any sensor capable of providing a touch sensor signal indicative of a sub-area of the touch sensor being touched by a finger. Such touch sensors are per se known and may, for example, utilize capacitive, resistive, thermal or optical methods for sensing at least the presence and location of a finger on the touch sensor. Touch sensors are widely employed in, for instance, the touch display of smart phones and tablets, and also in the track pad of laptop computers etc. It should be understood that active circuitry of the touch sensor need not be directly touched by the finger, but that the touch sensor may sense a finger touch through some protective coating, such as a glass cover. A finger touching a sub-area of a protective cover arranged on top of the touch sensor is considered to be touching a sub-area of the touch sensor.

The fingerprint sensor may, for example, be a capacitive fingerprint sensor detecting a measure indicative of the capacitive coupling between each sensing element in an array of sensing elements and a finger surface touching the fingerprint sensor surface. Sensing elements at locations corresponding to ridges in the fingerprint will exhibit a stronger capacitive coupling to the finger than sensing elements at locations corresponding to valleys in the fingerprint.

However, the various embodiments of the present invention are not limited to a particular fingerprint sensing technology, but are equally applicable to, for instance, optical, thermal or piezo-electric fingerprint sensors etc.

The present invention is based upon the realization that the fingerprint sensor, in an electronic device also comprising a touch sensor, may be arranged sufficiently close to the touch sensor that a finger placement on the fingerprint sensor practically always also results in the finger touching the touch sensor, and that information about the finger touch on the touch sensor can be used to improve the authentication performance of the fingerprint sensing system comprised in the electronic device.

During a finger placement on the fingerprint sensor, the finger is stationary on the fingerprint sensor. This should be understood to mean that the finger is not moved laterally across the fingerprint sensor, such as would be the case for a fingerprint sensor of the so-called swipe sensor type.

In some embodiments, information from the finger deduced from the touch sensor signal acquired from the touch sensor can be compared with stored corresponding information about the enrolled finger.

In other embodiments, the above-mentioned information about the finger obtained in connection with an authentication attempt can be used to improve the performance of the authentication even when there is no stored corresponding information. For instance, information about the shape, elasticity and/or orientation etc. of the finger can be used as an auxiliary authentication factor. If, for example, the information about the finger obtained using the touch sensor indicates that the candidate finger (which may not be a live finger) has a very unusual shape, or if the candidate finger does not deform on finger placement as expected, the requirements on the matching between the authentication representation (based on the candidate fingerprint) and the stored enrollment representation can be set to be more severe.

In embodiments, furthermore, information about the finger touch on the touch sensor together with the known positional relationship between the touch sensor and the fingerprint sensor can be used to at least approximately relate the acquired partial fingerprint image to a corresponding portion of the user's fingerprint. For instance, the portion of the fingerprint in the acquired partial fingerprint image can be related to a finger co-ordinate system.

According to various embodiments of the invention, the authentication performance, including the capability of rejecting spoofing attempts, can be improved. Furthermore, this can be achieved without extensive additional image processing and analysis of the acquired fingerprint images, but using the limited amount of data from the touch sensor, which generally has a much lower resolution than the fingerprint sensor.

Moreover, through various embodiments of the present invention, the time of authentication can be reduced, for example by only attempting to match the authentication representation with the stored enrollment representation for rotations and/or translations that are geometrically realistic in view of the information about the finger acquired from the touch sensor.

In various embodiments, the step of determining the authentication result may advantageously comprise the steps of: determining, by the processing circuitry, an authentication criterion based on the at least one touch sensor signal; comparing, by the processing circuitry, the authentication representation with the stored enrolment representation; and determining, by the processing circuitry, the authentication result based on the comparison and the authentication criterion.

As will be evident to one skilled in the field of fingerprint authentication, the authentication criterion may be any criterion affecting the requirement on the matching between the authentication representation and the stored enrollment representation to result in a successful authentication. For example, the authentication criterion may be a factor that is used to modify a matching score, or the authentication criterion may be a factor that is used to modify a threshold score with which the matching score may be compared to decide if the authentication attempt is successful or not. Alternatively, or in combination, the authentication criterion and the above-mentioned comparison between the authentication representation and the stored enrollment representation may need to fulfill separate predetermined requirements in order for the authentication attempt to be considered successful.

In some embodiments, candidate finger data indicative of at least one property of the candidate finger may be determined based on the at least one touch sensor signal, and the authentication criterion may be determined based on the candidate finger data.

Examples of properties of the candidate finger that may be determined based on the touch sensor signal(s) include: a dimension; a relation between dimensions; a deformation property; an electrical property; and a perspiration property.

For instance, the shape of the finger as imaged on the touch sensor can be used. The authentication criterion can then be based on any suitable dimensional property or combination of dimensional properties, from something simple, such as maximum finger width to something more complicated, such as the curvature of the fingertip. Although being more complicated than measuring a simple dimension, matching curvatures is a well-researched field and comparing low resolution curves in 2D is a problem of low complexity.

As was explained above, the authentication criterion may be based on information about the candidate finger only, or on information about the candidate finger and stored information about the enrolled finger. In the latter case, enrollment finger data (features) may be extracted during enrollment and stored in the enrolled finger template together with the above-mentioned enrollment representation of the enrolled fingerprint. Upon authentication, a similar extraction may be performed to obtain candidate finger data (features). A comparison can then be made, and a score may be determined based on the similarity between the enrollment finger data and the candidate finger data.

These features (the enrolled finger data and the candidate finger data) would not be unique enough to by themselves offer the discriminative power needed for fingerprint verification, but by fusing them with the biometric methods using the fingerprint sensor, a significant gain can be made as attempts with very dissimilar finger sizes can easily be rejected even if small scale features coincidentally are the same.

In embodiments, the stored enrolled finger data may comprise an indication of an enrolled positional relationship between the enrolled fingerprint and the enrolled finger; and the step of determining the candidate finger data may further comprise determining a candidate positional relationship between the candidate fingerprint and the candidate finger.

When extracting detailed fingerprint information from the fingerprint image acquired from the fingerprint sensor, the touch sensor signal can provide a positional relationship between the candidate fingerprint and the candidate finger, that is, an estimate on where upon the finger the detailed information from the fingerprint sensor is located and anchoring it to the co-ordinate system of the finger.

Upon a matching verification, the classic fingerprint recognition algorithms will provide information of what rotation and translation would be needed of the finger to give the achieved score. For a fingerprint sensor used together with a touch sensor, the fingerprint sensor based result can then be correlated with a touch sensor based estimation of the same and the fingerprint matching score can then be adjusted based on this correlation. For example if an impostor attempt coincidentally matches at a rotation that would mean that the whole hand more or less would have to cover the touch sensor but the touch sensor only detects a fingertip, then that is a strong indication to decrease the matching score.

In various embodiments, furthermore, the step of acquiring, for the candidate finger placement on the fingerprint sensor, at least one touch sensor signal may comprise acquiring a sequence of touch sensor signals each being indicative of an instantaneous sub-area of the touch sensor being touched by the candidate finger; and the authentication criterion may be based on the sequence of touch sensor signals.

The method may advantageously further comprise the step of: determining an indication of at least one instantaneous dimension of the candidate finger based on each of the touch sensor signals, resulting in candidate finger data indicative of a candidate sequence of dimensions of the candidate finger, and the authentication criterion may be based on the candidate finger data.

By using the sequence of touch sensor signals acquired for a candidate finger, the deformation properties of the candidate finger can be evaluated, and spoofing attempts may be rejected. The deformation properties obtained using the sequence of touch sensor signals may be compared with a predefined range for live fingers, or may be compared with corresponding deformation information for the enrolled finger comprised in the enrolled template.

In addition, according to embodiments of the present invention, the step of acquiring at least one fingerprint image may advantageously comprise acquiring a sequence of fingerprint images; and the authentication result may be further based on the sequence of fingerprint images.

For instance, the sequence of fingerprint images may be used for determining an indication of a perspiration property of the candidate finger, and the authentication result may be further based on the perspiration property. For example, the perspiration property may be used for determining the above-mentioned authentication criterion.

According to a second aspect of the present invention, there is provided a method of enrolling a fingerprint of a user's finger, by means of an electronic device comprising: a touch sensor for touch-based control of the electronic device, the touch sensor having an active area corresponding to a first surface portion of the electronic device; and a fingerprint sensor having an active area corresponding to a second surface portion of the electronic device, the method comprising the steps of: acquiring, from the fingerprint sensor, for each finger placement in a sequence of finger placements on the fingerprint sensor, a partial fingerprint image of a portion of the fingerprint; acquiring, from the touch sensor, a touch sensor signal indicative of a sub-area of the touch sensor being touched by the finger; determining an enrolled fingerprint representation of the fingerprint based on the acquired partial fingerprint images; determining enrolled finger data indicative of a dimensional property of the finger based on the touch sensor signal; forming a fingerprint template including the enrolled fingerprint representation and the enrolled finger data; and saving the fingerprint template together with an identifier for the fingerprint to thereby enroll the fingerprint.

The method according to the present second aspect of the invention may further comprise the step of: determining, for at least one finger placement in the sequence of finger placements on the fingerprint sensor, a positional relationship between the portion of the fingerprint and the finger based on the sub-area indicated by the touch sensor signal and a positional relationship between the first and second surface portions of the electronic device.

Further embodiments of, and effects obtained through this second aspect of the present invention are largely analogous to those described above for the first aspect of the invention.

According to a third aspect of the present invention, there is provided an electronic device comprising: a touch sensor for touch-based control of the electronic device, the touch sensor having an active area corresponding to a first surface portion of the electronic device; a fingerprint sensor having an active area corresponding to a second surface portion of the electronic device; a memory; and processing circuitry connected to the touch sensor, the fingerprint sensor, and the memory for: acquiring, from the touch sensor, for a candidate finger placement on the fingerprint sensor, at least one touch sensor signal indicative of a sub-area of the touch sensor being touched by the candidate finger; acquiring, from the fingerprint sensor, for the candidate finger placement on the fingerprint sensor, at least one fingerprint image of the candidate fingerprint; retrieving, by the processing circuitry, a stored enrollment representation of the enrolled fingerprint of the enrolled finger; determining, by the processing circuitry, an authentication representation of the candidate fingerprint based on the fingerprint image; and determining, by the processing circuitry, an authentication result based on the authentication representation, the stored enrollment representation, and the at least one touch sensor signal.

The processing circuitry may be provided in the form of one or several processors, which may also control other functions of the electronic device.

The above-mentioned first and second surface portions may advantageously be arranged in such a way that placement of a finger on the fingerprint sensor almost inevitably results in at least a portion of the finger also covering the touch sensor. To that end, the fingerprint sensor may be arranged substantially directly adjacent to the touch sensor, or be at least partly surrounded by the touch sensor. In embodiments, a portion of the touch sensor may be configured to function as the fingerprint sensor, for example by having a considerably higher resolution than other portions of the touch sensor.

Moreover, the first and second surface portions may advantageously be on the same face of the electronic device (if the electronic device has a substantially planar face), to facilitate simultaneous placement of the finger on the touch sensor and the fingerprint sensor.

Further embodiments of, and effects obtained through this third aspect of the present invention are largely analogous to those described above for the first and second aspects of the invention.

In summary, the present invention relates to a method of authenticating a candidate fingerprint by means of an electronic device comprising a touch sensor; and a fingerprint sensor. The method comprises the steps of: acquiring at least one touch sensor signal indicative of a sub-area of the touch sensor being touched by the candidate finger; acquiring at least one fingerprint image of the candidate fingerprint; retrieving a stored enrollment representation of the enrolled fingerprint of the enrolled finger; determining an authentication representation of the candidate fingerprint based on the fingerprint image; and determining an authentication result based on the authentication representation, the stored enrollment representation, and the at least one touch sensor signal.

BRIEF DESCRIPTION OF THE DRAWINGS

These and other aspects of the present invention will now be described in more detail, with reference to the appended drawings showing an example embodiment of the invention, wherein:

FIG. 1 schematically shows an exemplary candidate finger placement on the fingerprint sensor in connection with an authentication attempt;

FIG. 2 illustrates matching, including rotation, between a candidate representation of the candidate fingerprint and a stored enrollment representation of an enrolled fingerprint;

FIGS. 13a-b schematically illustrate two embodiments of the electronic device according to the present invention; and FIG. 14 schematically illustrates a further embodiment of the electronic device according to the present invention.

DETAILED DESCRIPTION OF EXAMPLE EMBODIMENTS

Figure 3:
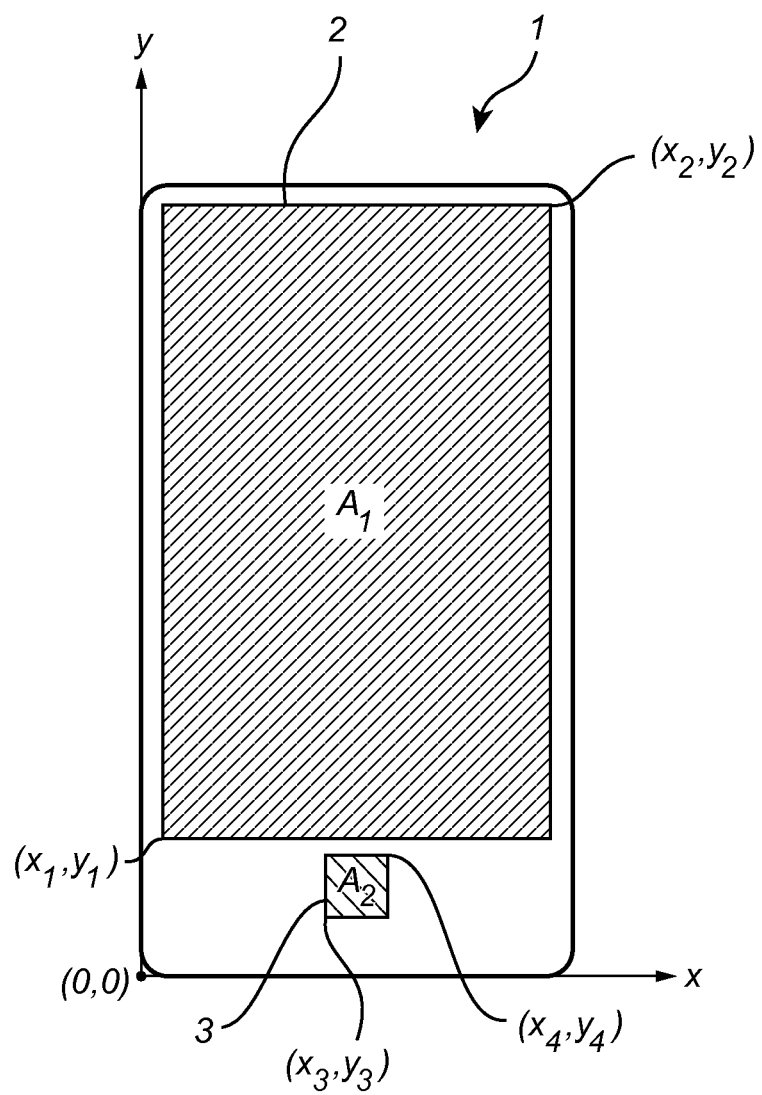
FIG. 3 schematically illustrates the positional relationship between touch sensor and fingerprint sensor in an electronic device according to embodiments of the present invention.

In the present detailed description, various embodiments of the method and electronic device according to the present invention are mainly described with reference to a substantially square fingerprint sensor arranged adjacent to the touch display of a mobile phone.

It should be noted that this by no means limits the scope of the present invention, which equally well includes, for example, other electronic devices such as tablets, computers or watches. Furthermore, the fingerprint sensor may have any other shape. For instance, the fingerprint sensor may be provided as an elongated rectangle.

FIG. 1 schematically shows an exemplary candidate finger placement in connection with an authentication attempt. Referring to FIG. 1, an electronic device, here in the form of mobile phone 1, comprises a touch display 2 and a fingerprint sensor 3. The touch display 2 comprises a touch sensor for touch-based control of the mobile phone 1 and a display acting as a user interface.

In FIG. 1, the user of the mobile phone 1 makes an authentication attempt by placing his finger 5 on the fingerprint sensor 3.

As an introduction to a description of embodiments of the present invention, FIG. 2 illustrates a conventional approach to authentication, in which an authentication representation, here indicated in the form of characteristic features $M_1$, $M_2$, $M_3$, and $M_4$, extracted from the fingerprint image 25 of the candidate fingerprint is compared with a stored enrollment representation 9 of an enrolled fingerprint.

As is schematically illustrated in FIG. 2, the authentication representation $M_1$-$M_4$ could be matched with the stored enrollment representation following rotation.

Especially with a small fingerprint sensor 3 such as the one comprised in the electronic device 1 in FIG. 1, typically no further information about the candidate finger 5 can be obtained in addition to the fingerprint information of the portion of the fingerprint touching the small fingerprint sensor 3.

Various embodiments of the present invention providing for an improved authentication performance will be described in the following.

FIG. 3 schematically illustrates the positional relationship between touch sensor and fingerprint sensor in an electronic device according to embodiments of the present invention.

Referring to FIG. 3, the electronic device 1 comprises a touch display 2 including a touch sensor having an active area corresponding to a first surface portion $A_1$ of the electronic device 1, and a fingerprint sensor 3 having an active area corresponding to a second surface portion $A_2$ of the electronic device 1. The active area of the touch sensor 2 is the area in which the presence of a finger over the surface of the touch sensor can be detected, and the active area of the fingerprint sensor 3 is the area of the fingerprint sensor 3 that can be used for imaging a portion of the fingerprint.

In the illustrative example of FIG. 3, the first surface portion $A_1$ is defined by two co-ordinates—lower left corner $(x_1, y_1)$ and upper right corner $(x_2, y_2)$, and the second surface portion $A_2$ is defined by two co-ordinates—lower left corner $(x_3, y_3)$ and upper right corner $(x_4, y_4)$.

Through the known positional relationship between the first $A_1$ and second $A_2$ surface portions, a position in the first surface portion $A_1$ can be related to a position in the second surface portion $A_2$, and vice versa.

Figure 4:
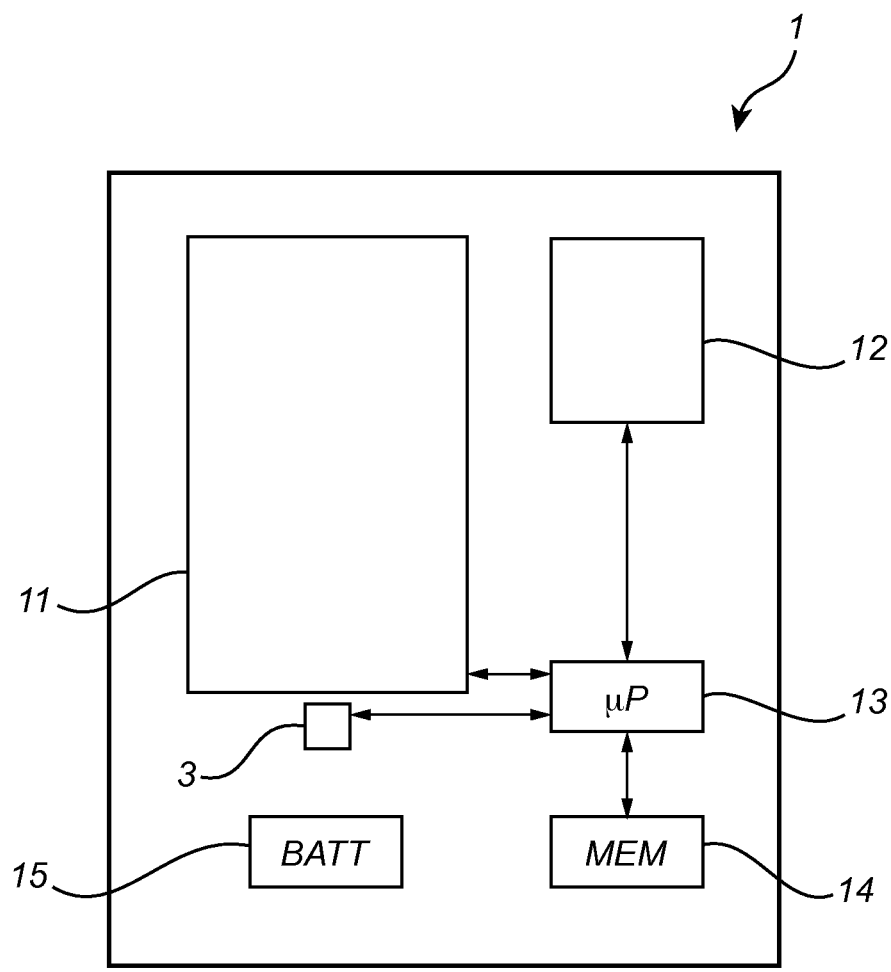
FIG. 4 is a block diagram of the electronic device in FIG. 3.

Referring to the block diagram in FIG. 4, the electronic device 1 in FIG. 3 comprises, in addition to the fingerprint sensor 3, a touch sensor 11 a display 12, processing circuitry here in the form of microprocessor 13, a memory 14, and a battery 15 for providing electrical energy to the various components of the electronic device 1. Although not shown in FIG. 4, the electronic device may comprise further components depending on application. For instance, the electronic device 1 may comprise circuitry for wireless communication, circuitry for voice communication, a keyboard etc.

Furthermore, although the processing circuitry is schematically indicated in FIG. 3 as a single microprocessor, it should be noted that this is a simplified illustration, and that the processing circuitry may comprise several processors. For instance, the processing circuitry may comprise a fingerprint processor dedicated for acquisition and processing of fingerprint images, template generation and/or authentication. Moreover, the processing circuitry may comprise a touch sensor processor dedicated for controlling the touch sensor etc.

According to embodiments of the present invention, a touch sensor signal indicative of a sub-area of the touch sensor 11 being touched by the candidate finger 5 is used for improving the performance of the authentication in various ways.

Figure 5:
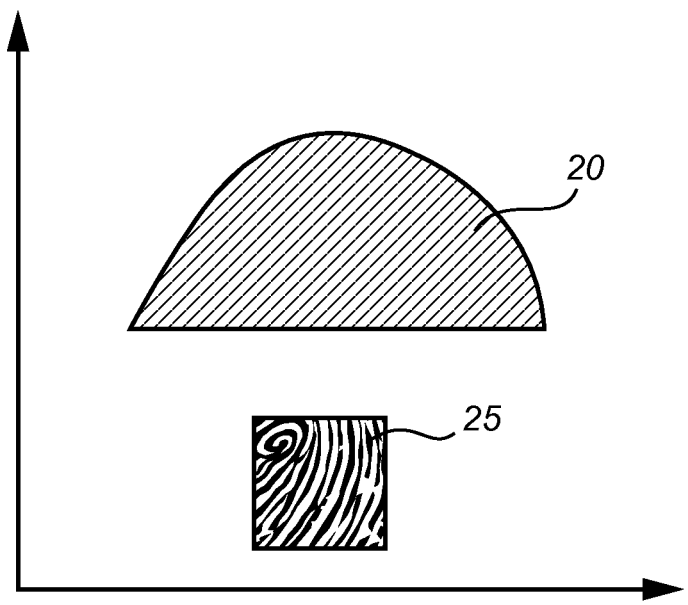
FIG. 5 schematically shows the sub-area of the touch sensor covered by the finger in FIG. 1 and the concurrently acquired partial fingerprint image in the co-ordinate system of the electronic device as shown in FIG. 3.

FIG. 5 schematically indicates the positional relationship between the sub-area 20 of the touch sensor 11 and the candidate fingerprint 25 obtained by the fingerprint sensor 3. In FIG. 5, the sub-area 20 of the touch sensor 11 being touched by the finger 5 and the fingerprint 25 imaged in the candidate fingerprint image are shown in the co-ordinate system of the electronic device 1 as described above with reference to FIG. 3.

Figure 6:
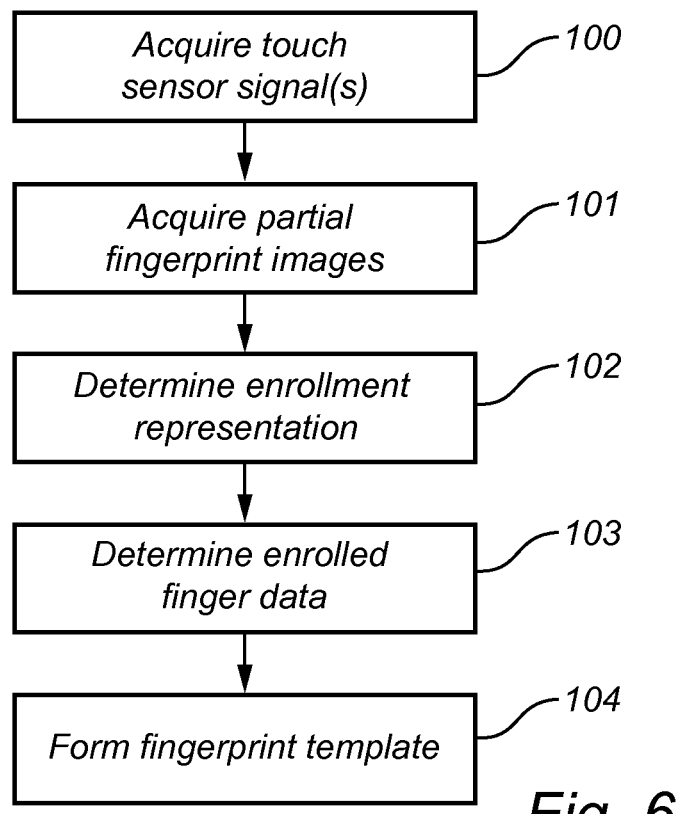
FIG. 6 is a flow-chart schematically illustrating an enrollment method according to embodiments of the present invention.

Exemplary embodiments of the enrollment method according to the present invention will now be described with reference to the flow-chart in FIG. 6 together with the illustrations in FIG. 3, FIG. 4, FIG. 5, FIG. 7 and FIGS. 8a-b.

In a first step 100 of the enrollment method, at least one touch sensor signal is acquired from the touch sensor 11 by the processing circuitry 13 in connection with a finger placement on the fingerprint sensor 3 and on the touch sensor 11. In connection with the same finger placement, a partial fingerprint image is acquired by the processing circuitry 13 from the fingerprint sensor 3 in step 101.

Step 101 or steps 100 and 101 may be repeated to acquire new partial fingerprint images until an enrollment representation 9 of the enrolled fingerprint can be formed, in step 102, based on the partial fingerprint images.

Subsequently, in step 103, enrolled finger data indicative of at least one property of the enrolled finger is determined.

Figure 7:
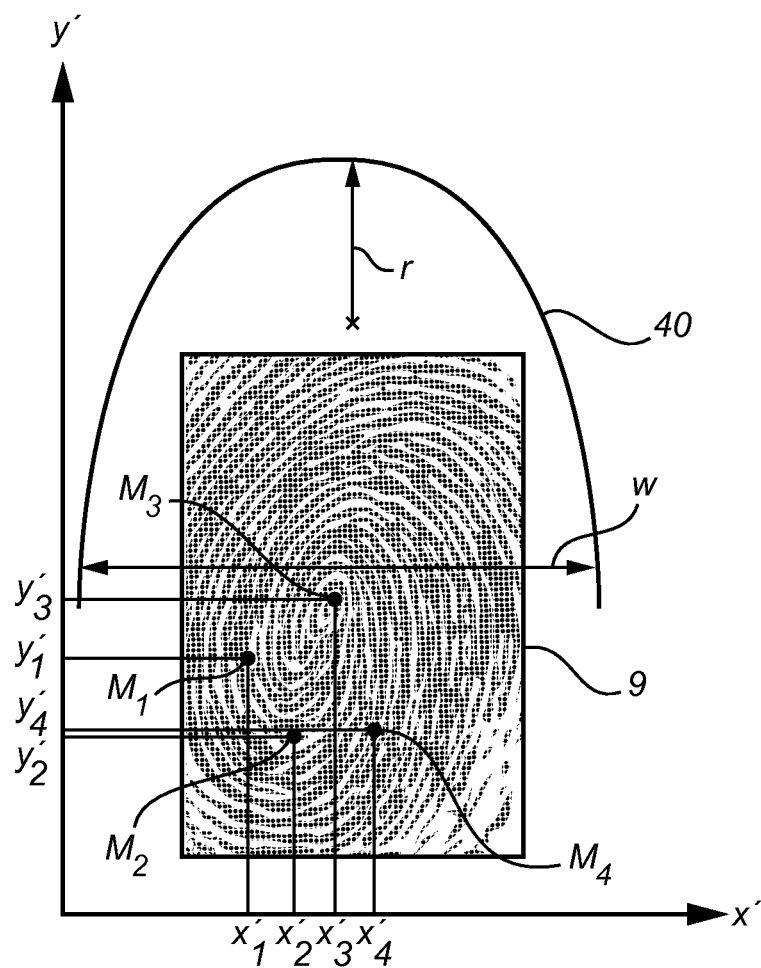
FIG. 7 is a schematic illustration of an enrolled fingerprint template formed using the method according to the flow-chart in FIG. 6.

Referring to FIG. 7, such enrolled finger data may be indicative of the shape of the finger and/or of the positional relationship between features in the enrolled fingerprint and the finger 5.

In FIG. 7, the enrolled fingerprint representation 9 (here shown with an exemplary fingerprint pattern for illustration) and the contour 40 of the finger 5 are arranged in a co-ordinate system for the finger 5. As described above, the enrolled fingerprint representation 9 is formed by a sequence of partial fingerprint images. The contour 40 (or other geometrical representation) of the finger 5 may be formed based on a single touch sensor signal, or a plurality of touch sensor signals. For instance, one touch sensor signal may be acquired in connection with each finger placement on the fingerprint sensor 3.

FIG. 7 also schematically shows some illustrative examples of enrolled finger data determined in step 103. Enrolled finger data may, for example, include the width 'w' of the finger, the curvature 'r' of the finger tip, and respective positions $(x'_1, y'_1)$, $(x'_2, y'_2)$, $(x'_3, y'_3)$, and $(x'_4, y'_4)$ of enrolled features $M_1$, $M_2$, $M_3$, and $M_4$ in the co-ordinate system of the finger 5.

Figure 8A:
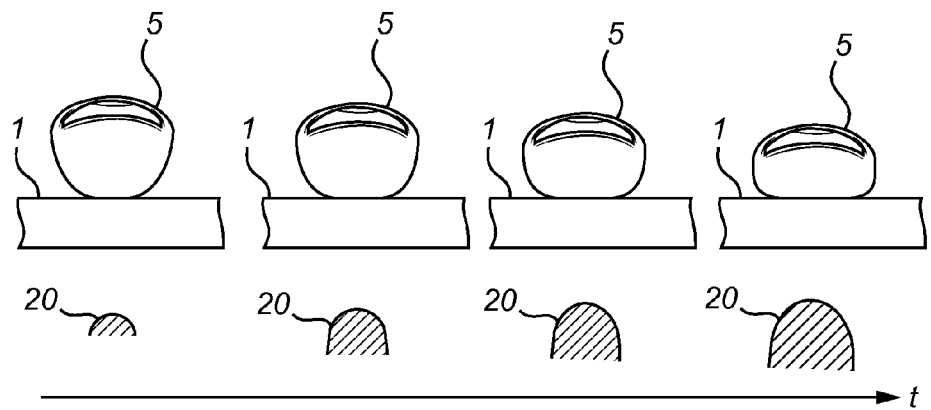
FIGS. 8a-b schematically partly illustrate another enrolled fingerprint template formed using the method according to the flow-chart in FIG. 6.
Figure 8B:
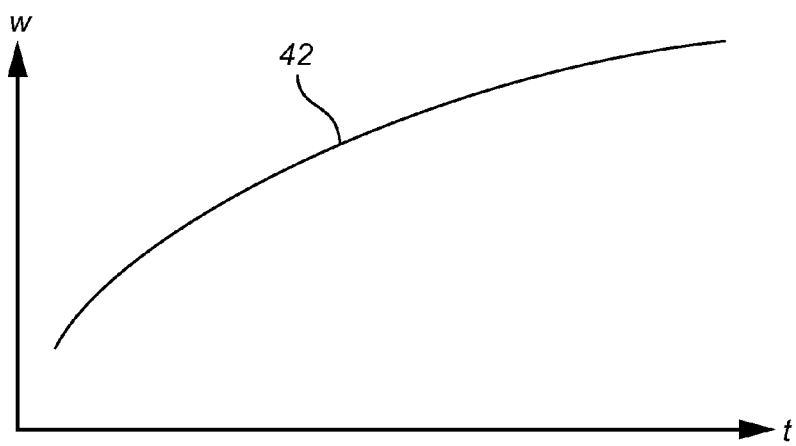

Referring to FIGS. 8a-b, enrolled finger data may alternatively, or in combination, be indicative of the deformation of the enrolled finger.

FIG. 8a schematically shows a finger placement on the fingerprint sensor 3 on the surface of the electronic device 1, from first contact to the left in FIG. 8a to full contact to the right in FIG. 8a.

As is also schematically indicated in FIG. 8a, a sequence of touch sensor signals are acquired, where each touch sensor signal in the sequence indicates a sub-area 20 being touched by the candidate finger.

FIG. 8b is a schematic indication of the development of the finger width, as seen by the touch sensor, increasing over time from first touch to full touch. This development, represented here by the curve 42, may constitute, or be included in the enrolled finger data determined in step 103.

Finally, in step 104, the fingerprint template for the enrolled fingerprint is formed by combining the enrollment representation determined in step 102 and the enrolled finger data determined in step 103.

Figure 9:
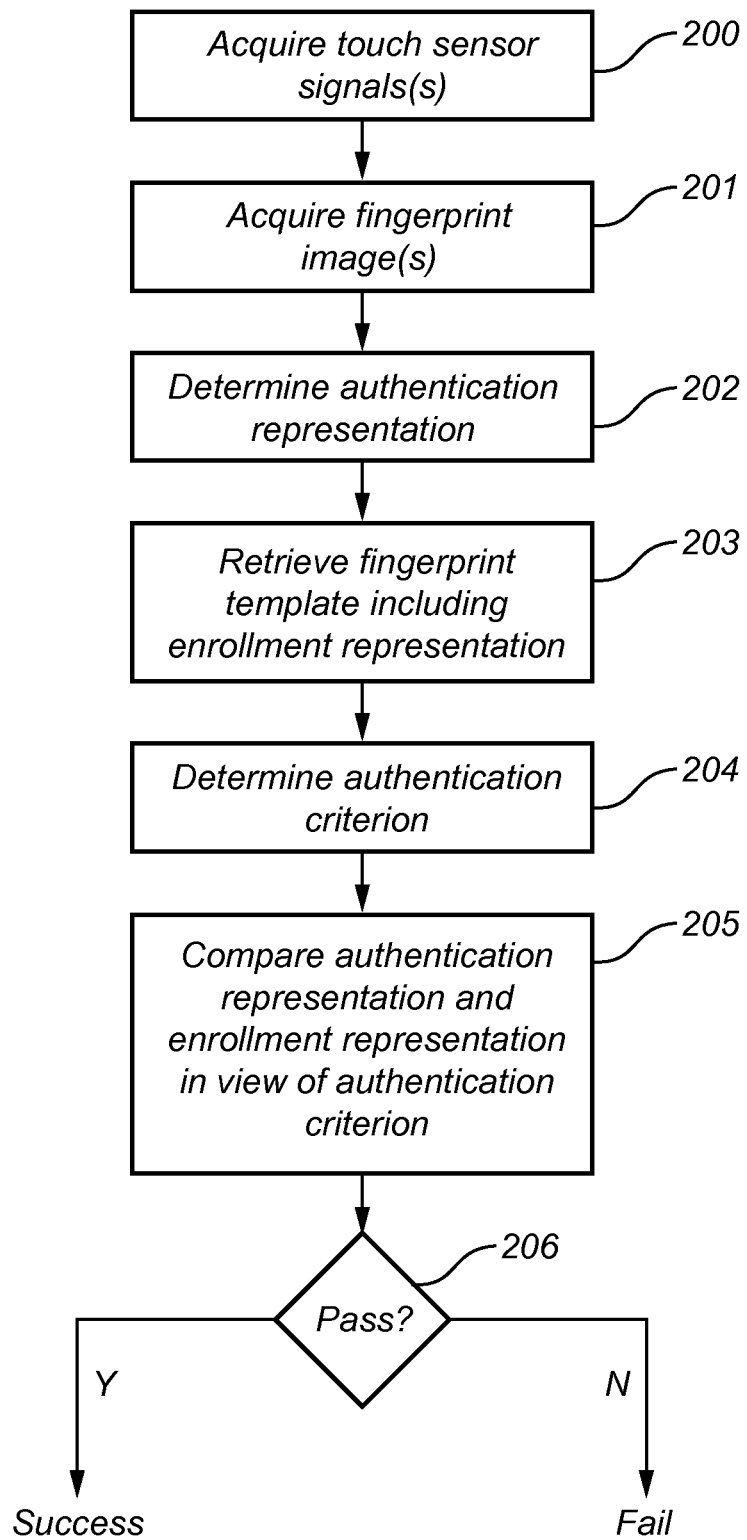
FIG. 9 is a flow-chart schematically illustrating an authentication method according to embodiments of the present invention.

Exemplary embodiments of the authentication method according to the present invention will now be described with reference to the flow-chart in FIG. 9 together with the illustrations in FIG. 3, FIG. 4, FIG. 10, FIG. 11 and FIGS. 12a-b.

In a first step 200 of the authentication method, at least one touch sensor signal is acquired from the touch sensor 11 by the processing circuitry 13 in connection with a finger placement on the fingerprint sensor 3 and on the touch sensor 11. In connection with the same finger placement, a partial fingerprint image 25 is acquired by the processing circuitry 13 from the fingerprint sensor 3 in step 201.

Figure 10:
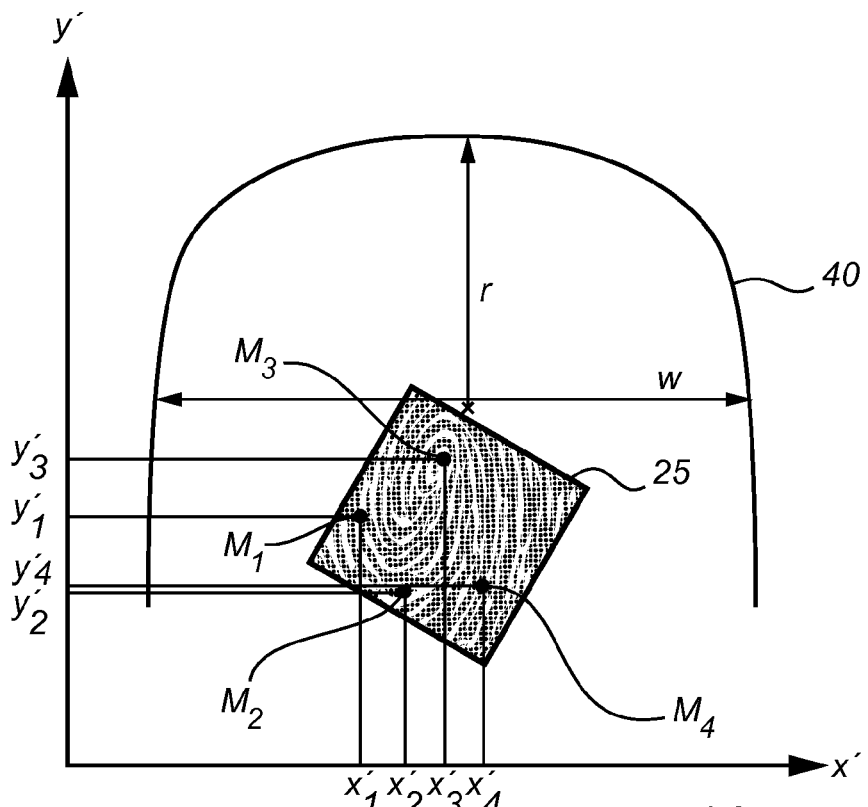
FIG. 10 schematically illustrates a first authentication attempt using the method according to the flow-chart in FIG. 9.
Figure 11:
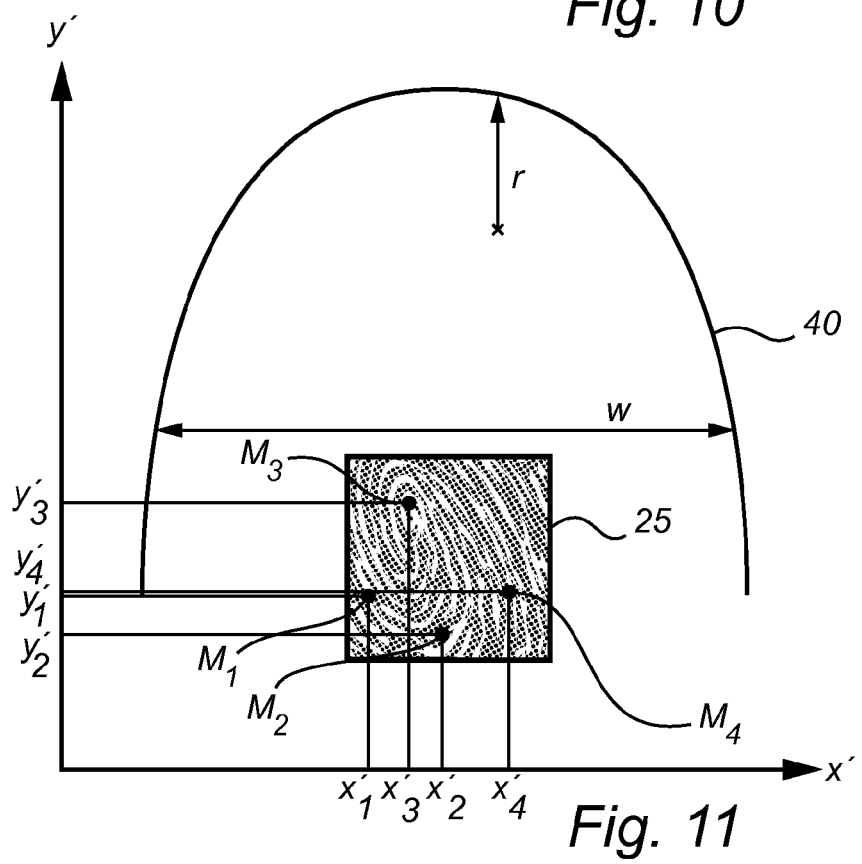
FIG. 11 schematically illustrates a second authentication attempt using the method according to the flow-chart in FIG. 9.

In the subsequent step 202, an authentication representation is determined, represented by the characteristic features $M_1$, $M_2$, $M_3$, and $M_4$ in FIG. 10 and FIG. 11.

In the following step 203, a stored fingerprint template including an enrollment representation of the enrolled fingerprint is retrieved from memory. In some embodiments, the stored fingerprint template may further include enrolled finger data indicative of a further property of the enrolled finger, in addition to the fingerprint. Example methods of how to determine such a fingerprint template, with and without enrolled finger data, were described above.

After having retrieved the fingerprint template in step 203, the authentication method proceeds to determine an authentication criterion in step 204. It should be noted that the steps of the authentication method need not necessarily take place in the order indicated in the flow-chart of FIG. 9. On the contrary, the authentication criterion may, for example, be determined before the stored fingerprint template is retrieved and/or before the authentication representation is determined.

The authentication criterion may be used for allowing information about the candidate finger, in addition to the candidate fingerprint pattern, to influence the authentication result. As has been explained further above, the authentication may be determined based on information obtained in connection with the authentication attempt, or on information obtained in connection with the authentication attempt together with stored information obtained in connection with enrollment of the enrolled finger.

In the next step 205, the authentication representation and the enrollment representation are compared in view of the authentication criterion, and the result of the comparison is evaluated in step 206, resulting in a successful or failed authentication attempt.

FIG. 10 schematically shows a first authentication attempt, where the authentication representation, indicated by extracted features $M_1$, $M_2$, $M_3$, and $M_4$ (here shown in the acquired fingerprint image 25 for illustration) and the contour 40 of the candidate finger 5 are arranged in a co-ordinate system for the finger 5.

The contour 40 (or other geometrical representation) of the candidate finger 5 may be formed based on a single touch sensor signal, or a plurality of touch sensor signals.

FIG. 10 also schematically shows some illustrative examples of candidate finger data. Candidate finger data may, for example, include the width w of the finger, the curvature r of the finger tip, and respective positions $(x'_1, y'_1)$, $(x'_2, y'_2)$, $(x'_3, y'_3)$, and $(x'_4, y'_4)$ of features $M_1$, $M_2$, $M_3$, and $M_4$ extracted from the acquired fingerprint image 25 in the co-ordinate system of the finger 5.

In the exemplary authentication attempt illustrated by FIG. 10, the curvature of the tip, here indicated by the radius of curvature 'r' for simplicity, may indicate that the candidate finger is unlikely to be a real finger based on a predetermined range for real fingers. The authentication criterion may therefore be determined so as to increase the demands on the authentication attempt, to thereby reduce the likelihood of a successful authentication.

In other embodiments, the stored finger template may include enrolled finger information indicating, for example, the width w of the finger, the curvature r of the finger tip, and respective positions $(x'_1, y'_1)$, $(x'_2, y'_2)$, $(x'_3, y'_3)$, and $(x'_4, y'_4)$ of enrolled features $M_1$, $M_2$, $M_3$, and $M_4$ in the co-ordinate system of the finger 5.

The authentication criterion may then be determined based on a comparison between the stored enrolled finger information and corresponding candidate finger information determined in connection with an authentication attempt. In the case of the authentication attempt illustrated in FIG. 10, a comparison with the illustration of the finger template in FIG. 7 gives that the candidate finger features and the enrolled features appear to be arranged in approximately the same positions in the co-ordinate system of the finger, but that the curvature of the tip is indeed quite different. The authentication criterion should therefore be determined to strongly reduce the likelihood of a successful authentication.

Another exemplary authentication attempt is schematically illustrated in FIG. 11. Comparing FIG. 11 and FIG. 7, it can be seen that the characteristic features appear to match well and that the finger dimensions, represented by the width 'w' and the radius of curvature 'r' of the tip are similar, but that the positions of the characteristic features in the co-ordinate system of the finger 5 are quite different. Again, the authentication criterion should therefore be determined to strongly reduce the likelihood of a successful authentication.

As was explained above in connection with the description of embodiments of the enrollment method of the present invention, enrolled finger data may be indicative of the deformation of the enrolled finger. This is schematically illustrated in FIGS. 8a-b, where FIG. 8a schematically shows a finger placement on the fingerprint sensor 3 on the surface of the electronic device 1, from first contact to the left in FIG. 8a to full contact to the right in FIG. 8a, and FIG. 8b is a schematic indication of the development of the finger width, as seen by the touch sensor, increasing over time from first touch to full touch, represented by the curve 42.

Figure 12A:
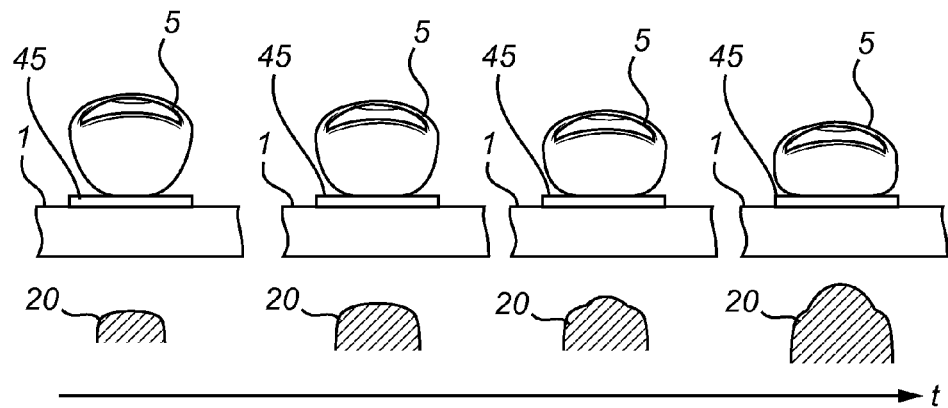
FIGS. 12a-b schematically illustrate a third authentication attempt using the method according to the flow-chart in FIG. 9.
Figure 12B:
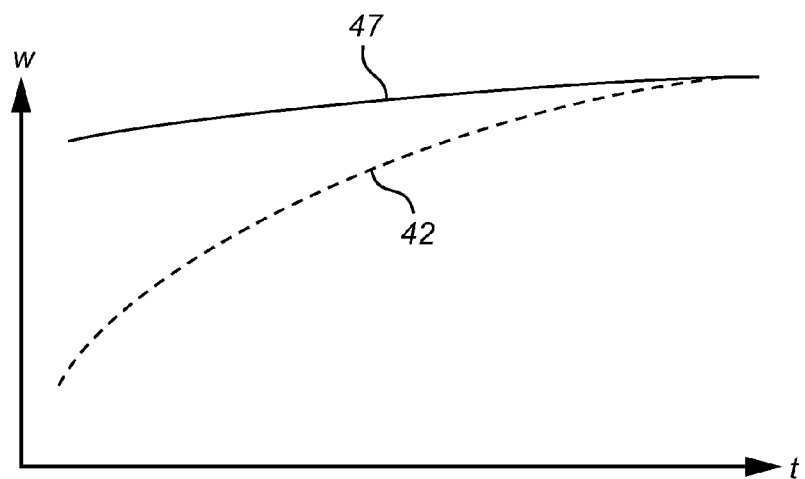

A further authentication attempt is illustrated by FIGS. 12a-b, which correspond to FIGS. 8a-b described above. The authentication attempt of FIGS. 12a-b is an attempt to spoof the fingerprint authentication system of the electronic device 1 using a thin fake finger 45, for example made of gelatin. The fake finger 45 is first placed on the fingerprint sensor 3, and then pressure is applied to the fake finger 45 using real finger 5. The resulting development of the finger width as seen by the touch sensor, increasing over time from first touch to full touch, is represented by the candidate finger deformation curve 47.

As can be seen in FIG. 12b, the deformation behavior obtained in connection with the authentication attempt using the fake finger 45 is quite different from the deformation behavior, indicated by the stored deformation curve 42. The authentication criterion should therefore be determined to strongly reduce the likelihood of a successful authentication.

So far, embodiments of the electronic device 1 according to embodiments of the present invention have been described in which the fingerprint sensor 3 is arranged closely adjacent to a touch display 2 comprising a touch sensor 11.

An example of this configuration is shown in a simplified and schematic cross-section view in FIG. 9a, where the electronic device is shown to comprise a cover glass, 32, a transparent touch sensor 11, a display 12, and a fingerprint sensor component 3. As can be seen in FIG. 9a, the touch sensor is sandwiched between the display 12, which may for example be an LCD, and the cover glass 32, and the fingerprint sensor component is arranged in an opening of the cover glass 32, with the top surface 33 of the fingerprint sensor 3 being arranged substantially flush with the top surface of the cover glass 32.

In another embodiment, which is shown in a similar cross-section view in FIG. 9b, the fingerprint sensor 3 is instead provided as a portion of the touch sensor 11. The fingerprint sensor portion of the touch sensor 11 may, for example, have a considerably higher resolution than the rest of the touch sensor 11.

As has been mentioned previously, the electronic device need not be a mobile phone or tablet, and the touch sensor need not be comprised in a touch display. For instance, as is schematically illustrated in FIG. 10, the electronic device 1 may instead be provided in the form of a laptop computer, and the touch sensor may be provided in the form of a track pad 35 of the computer.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A method of authenticating a candidate fingerprint of a candidate finger against an enrolled fingerprint of an enrolled finger by means of an electronic device comprising:
   a touch sensor for touch-based control of said electronic device, said touch sensor having an active area corresponding to a first surface portion of said electronic device;
   a fingerprint sensor having an active area corresponding to a second surface portion of said electronic device; and
   processing circuitry connected to said touch sensor and to said fingerprint sensor, wherein said method comprises the steps of:
   acquiring, from said touch sensor, during a candidate finger placement when said candidate finger is stationary on said fingerprint sensor, at least one touch sensor signal indicative of a sub-area of said touch sensor being touched by said candidate finger;
   acquiring, from said fingerprint sensor, during said candidate finger placement when said candidate finger is stationary on said fingerprint sensor, at least one fingerprint image of said candidate fingerprint;
   retrieving, by said processing circuitry, a stored enrollment representation of the enrolled fingerprint of said enrolled finger;
   retrieving, by said processing circuitry, stored enrolled finger data comprising an indication of an enrolled positional relationship between said enrolled fingerprint and said enrolled finger;
   determining, by said processing circuitry, an authentication representation of said candidate fingerprint based on said fingerprint image;
   determining, by said processing circuitry, candidate finger data indicative of a candidate positional relationship between said candidate fingerprint and said candidate finger based on said at least one touch sensor signal;

determining, by said processing circuitry, an authentication criterion based on a comparison of said candidate finger data and said stored enrolled finger data;

comparing, by said processing circuitry, said authentication representation with said stored enrolment representation; and determining, by said processing circuitry, an authentication result based on the comparison and said authentication criterion.

2. The method according to claim 1, wherein:

said step of acquiring, for said candidate finger placement on said fingerprint sensor, at least one fingerprint image comprises acquiring a sequence of fingerprint images; and said authentication result is further based on said sequence of fingerprint images.

3. The method according to claim 2, further comprising the step of:

determining an indication of a perspiration property of said candidate finger based on said sequence of fingerprint images, wherein said authentication result is further based on said perspiration property.

4. A method of authenticating a candidate fingerprint of a candidate finger against an enrolled fingerprint of an enrolled finger by means of an electronic device comprising:

a touch sensor for touch-based control of said electronic device, said touch sensor having an active area corresponding to a first surface portion of said electronic device;

a fingerprint sensor having an active area corresponding to a second surface portion of said electronic device; and processing circuitry connected to said touch sensor and to said fingerprint sensor, wherein said method comprises the steps of:

acquiring, from said touch sensor, during a candidate finger placement when said candidate finger is stationary on said fingerprint sensor, at least one touch sensor signal indicative of a sub-area of said touch sensor being touched by said candidate finger;

acquiring, from said fingerprint sensor, during said candidate finger placement when said candidate finger is stationary on said fingerprint sensor, at least one fingerprint image of said candidate fingerprint;

retrieving, by said processing circuitry, a stored enrollment representation of the enrolled fingerprint of said enrolled finger;

determining, by said processing circuitry, an authentication representation of said candidate fingerprint based on said fingerprint image; and determining, by said processing circuitry, an authentication result based on said authentication representation, said stored enrollment representation, and said at least one touch sensor signal, wherein said step of determining said authentication result comprises the steps of:

determining, by said processing circuitry, an authentication criterion based on said at least one touch sensor signal;

comparing, by said processing circuitry, said authentication representation with said stored enrolment representation; and determining, by said processing circuitry, said authentication result based on the comparison and said authentication criterion, wherein:

said step of acquiring, for said candidate finger placement on said fingerprint sensor, at least one touch sensor signal comprises acquiring a sequence of touch sensor signals each being indicative of an instantaneous sub-area of said touch sensor being touched by said candidate finger; and said authentication criterion is based on said sequence of touch sensor signals.

5. The method according to claim 4, further comprising the step of:

determining an indication of at least one instantaneous dimension of said candidate finger based on each of said touch sensor signals, resulting in candidate finger data indicative of a candidate sequence of dimensions of said candidate finger, wherein said authentication criterion is based on said candidate finger data.

6. The method according to claim 5, wherein said authentication criterion is based on a development over time of said at least one instantaneous dimension within said candidate dimension sequence of indications.

7. The method according to claim 5, further comprising the step of:

retrieving, by said processing circuitry, stored enrolled finger data indicative of an enrolled sequence of dimensions of said enrolled finger, wherein said authentication, wherein said authentication criterion is based on a comparison of said candidate finger data and said enrolled finger data.

8. A method of enrolling a fingerprint of a user's finger, by means of an electronic device comprising:

a touch sensor for touch-based control of said electronic device, said touch sensor having an active area corresponding to a first surface portion of said electronic device; and a fingerprint sensor having an active area corresponding to a second surface portion of said electronic device, said method comprising the steps of:

acquiring, from said fingerprint sensor, for each finger placement in a sequence of finger placements on said fingerprint sensor, a partial fingerprint image of a portion of said fingerprint;

acquiring, from said touch sensor, a touch sensor signal indicative of a sub-area of said touch sensor being touched by said finger;

determining an enrolled fingerprint representation of said fingerprint based on said acquired partial fingerprint images;

determining enrolled finger data indicative of a dimensional property of said finger based on said touch sensor signal;

forming a fingerprint template including said enrolled fingerprint representation and said enrolled finger data; and saving said fingerprint template together with an identifier for said fingerprint to thereby enroll said fingerprint.

9. The method according to claim 8, further comprising the step of:

determining, for at least one finger placement in said sequence of finger placements on said fingerprint sensor, a positional relationship between said portion of the fingerprint and said finger based on said sub-area indicated by the touch sensor signal and a positional relationship between said first and second surface portions of the electronic device.

10. An electronic device comprising:
a touch sensor for touch-based control of said electronic device, said touch sensor having an active area corresponding to a first surface portion of said electronic device;
a fingerprint sensor having an active area corresponding to a second surface portion of said electronic device;
a memory; and
processing circuitry connected to said touch sensor, said fingerprint sensor, and said memory for:
  acquiring, from said touch sensor, during a candidate finger placement when said candidate finger is stationary on said fingerprint sensor, at least one touch sensor signal indicative of a sub-area of said touch sensor being touched by said candidate finger;
  acquiring, from said fingerprint sensor, during said candidate finger placement when said candidate finger is stationary on said fingerprint sensor, at least one fingerprint image of said candidate fingerprint;
  retrieving, by said processing circuitry, a stored enrollment representation of the enrolled fingerprint of said enrolled finger;
  retrieving, by said processing circuitry, stored enrolled finger data comprising an indication of an enrolled positional relationship between said enrolled fingerprint and said enrolled finger;
  determining, by said processing circuitry, an authentication representation of said candidate fingerprint based on said fingerprint image;
  determining, by said processing circuitry, candidate finger data indicative of determining a candidate positional relationship between said candidate fingerprint and said candidate finger based on said at least one touch sensor signal;
  determining, by said processing circuitry, an authentication criterion based on a comparison of said candidate finger data and said stored enrolled finger data;
  comparing, by said processing circuitry, said authentication representation with said stored enrolment representation; and
  determining, by said processing circuitry, an authentication result based on the comparison and said authentication criterion.

11. The electronic device according to claim 10, wherein said touch sensor is comprised in a touch display.

12. The electronic device according to claim 10, wherein said second surface portion is adjacent to said first surface portion.

* * * * *